(12) United States Patent
Iida et al.

(10) Patent No.: US 6,546,631 B2
(45) Date of Patent: Apr. 15, 2003

(54) ENGINE CUTTER

(75) Inventors: Giichi Iida, Tokyo (JP); Hirofumi Yamami, Tokyo (JP)

(73) Assignee: Kioritz Corporation, Tokyo (JP)

( * ) Notice: Subject to any disclaimer, the term of this patent is extended or adjusted under 35 U.S.C. 154(b) by 84 days.

(21) Appl. No.: 09/735,734

(22) Filed: Dec. 13, 2000

(65) Prior Publication Data

US 2001/0003983 A1 Jun. 21, 2001

(30) Foreign Application Priority Data

Dec. 13, 1999 (JP) ............................. 11-353475

(51) Int. Cl.[7] ................................................ B23D 47/00
(52) U.S. Cl. ...................................... 30/124; 125/13.01
(58) Field of Search ........................ 30/124, 390, 391; 125/13.01

(56) References Cited

U.S. PATENT DOCUMENTS

| | | | |
|---|---|---|---|
| 1,990,991 A | 2/1935 | Heubach | 72/128 |
| 2,552,747 A | 5/1951 | Strimple et al. | 192/105 |
| 2,640,304 A | 6/1953 | McEwan | 51/148 |
| 3,711,946 A | 1/1973 | Troutman | 30/388 |
| 3,945,478 A | 3/1976 | Kellerman et al. | 192/105 |
| 5,033,192 A | 7/1991 | Franz et al. | 30/124 |
| 5,074,044 A | 12/1991 | Duncan et al. | 30/124 |
| 5,088,197 A | 2/1992 | Anderson | 30/122 |
| 5,146,682 A * | 9/1992 | Blochle et al. | 30/124 |
| 5,445,056 A | 8/1995 | Folci | 83/100 |
| 5,862,594 A | 1/1999 | Soderqvist | 30/122 |
| 5,890,292 A | 4/1999 | Stark et al. | 30/124 |
| 6,039,037 A | 3/2000 | Taomo et al. | 125/13.01 |
| 6,047,693 A | 4/2000 | Yamami et al. | 125/13.01 |

* cited by examiner

Primary Examiner—Douglas D. Watts
(74) Attorney, Agent, or Firm—Baker Botts LLP

(57) ABSTRACT

An engine cutter which is simple in structure and low in manufacturing cost. This engine cutter comprises a disk cutter, an air-cooled internal combustion engine for rotating the disk cutter, a safety cover partially encasing the disk cutter, and a dust-trapping portion which is mounted on the safety cover for trapping and discharging dust to be generated from a cutting work by the disk cutter; and is characterized in that only single fan to be driven by the engine is provided not only for generating an air flow for sucking and discharging the dust that has been trapped in the dust-trapping portion but also for generating a cooling air flow for cooling the internal combustion engine.

6 Claims, 5 Drawing Sheets

ENGINE CUTTER

BACKGROUND OF THE INVENTION

The present invention relates to an engine cutter, and in particular to an engine cutter comprising a disk cutter to be driven by an air-cooled internal combustion engine such as a small air-cooled two stroke gasoline engine, and a fan for sucking and discharging dust to be generated for instance from the cutting work of concrete-molded materials by the disk cutter.

As for the conventional engine cutter which is actually employed now, there is known that comprises a disk cutter, an air-cooled internal combustion engine for rotating the disk cutter, a safety cover partially encasing the disk cutter, a dust-trapping portion which is mounted on the safety cover for trapping and discharging dust to be generated from the cutting work by the disk cutter, and a fan to be driven by the engine and attached to the safety cover for generating an air flow for sucking and discharging the dust that has been trapped in the dust-trapping portion.

In this conventional engine cutter wherein an air-cooled internal combustion engine is employed as a driving source for rotating the disk cutter, a fan for generating an air flow for sucking and discharging the dust that has been trapped in the dust-trapping portion is disposed in addition to a cooling fan for the engine. Thus, according to this conventional engine cutter, a couple of fans are required to be equiped, i.e. one for cooling the engine, and the other for sucking and discharging dust.

Therefore, this conventional engine cutter is defective in that the structure thereof is rather complicated, and that the manufacturing cost thereof is inevitably increased.

BRIEF SUMMARY OF THE INVENTION

The present invention has been made to cope with the aforementioned problems, and therefore an object of the present invention is to provide an engine cutter wherein a single fan is employed for both cooling the engine and sucking and discharging dust, thereby simplifying the structure of engine cutter and at the same time, saving the manufacturing cost thereof.

With a view to realize the aforementioned object, the present invention provides an engine cutter which essentially comprises a disk cutter, an air-cooled internal combustion engine for rotating the disk cutter, a safety cover partially encasing the disk cutter, a dust-trapping portion which is mounted on the safety cover for trapping and discharging dust to be generated from a cutting work by the disk cutter, and a fan to be driven by the engine not only for generating an air flow for sucking and discharging the dust that has been trapped in the dust-trapping portion but also for generating a cooling air flow for cooling the internal combustion engine.

In a preferable embodiment of the engine cutter according to the present invention, part of the air flow generated by the fan is branched so as to be utilized as a cooling air flow for cooling the internal combustion engine, and the rotation of the internal combustion engine is transmitted to the fan through an acceleration of the rotation of the internal combustion engine, or alternatively, the output shaft of the internal combustion engine is directly coupled to the fan.

In another preferable embodiment of the engine cutter according to the present invention, the dust-trapping portion is preferably constituted by a trap-guiding plate interposed between the opposite surfaces of the cutter and the safety cover, and a dust sucking port disposed at a midway of a passageway for flowing the air flow generated by the fan.

In an additional preferable embodiment of the engine cutter according to the present invention, a dust-collecting bag having air permeability is attached to a downstream end of a passageway for flowing the air flow generated by the fan.

According to the engine cutter of the present invention which is constructed as explained above, since a single fan is employed not only for sucking and discharging the dust, but also for cooling the internal combustion engine, the construction of the cutter can be simplified, the total weight of the cutter can be reduced, and the manufacturing cost of the cutter can be saved.

Additionally, when the cutter is constructed such that the rotation of the internal combustion engine is transmitted to the fan through an acceleration of the rotation of the internal combustion engine, the quantity of air demanded for cooling the engine as well as the quantity of air demanded for sucking and discharging dust can be sufficiently secured without so greatly increasing the diameter of the fan.

This specification includes part or all of the contents as disclosed in the specification and/or drawings of Japanese Patent Application No.353475/1999, which is a priority document of the present application.

DETAILED DESCRIPTION OF THE INVENTION

Next, one embodiment of an engine cutter according to the present invention will be explained with reference to the drawings.

Figure 1:
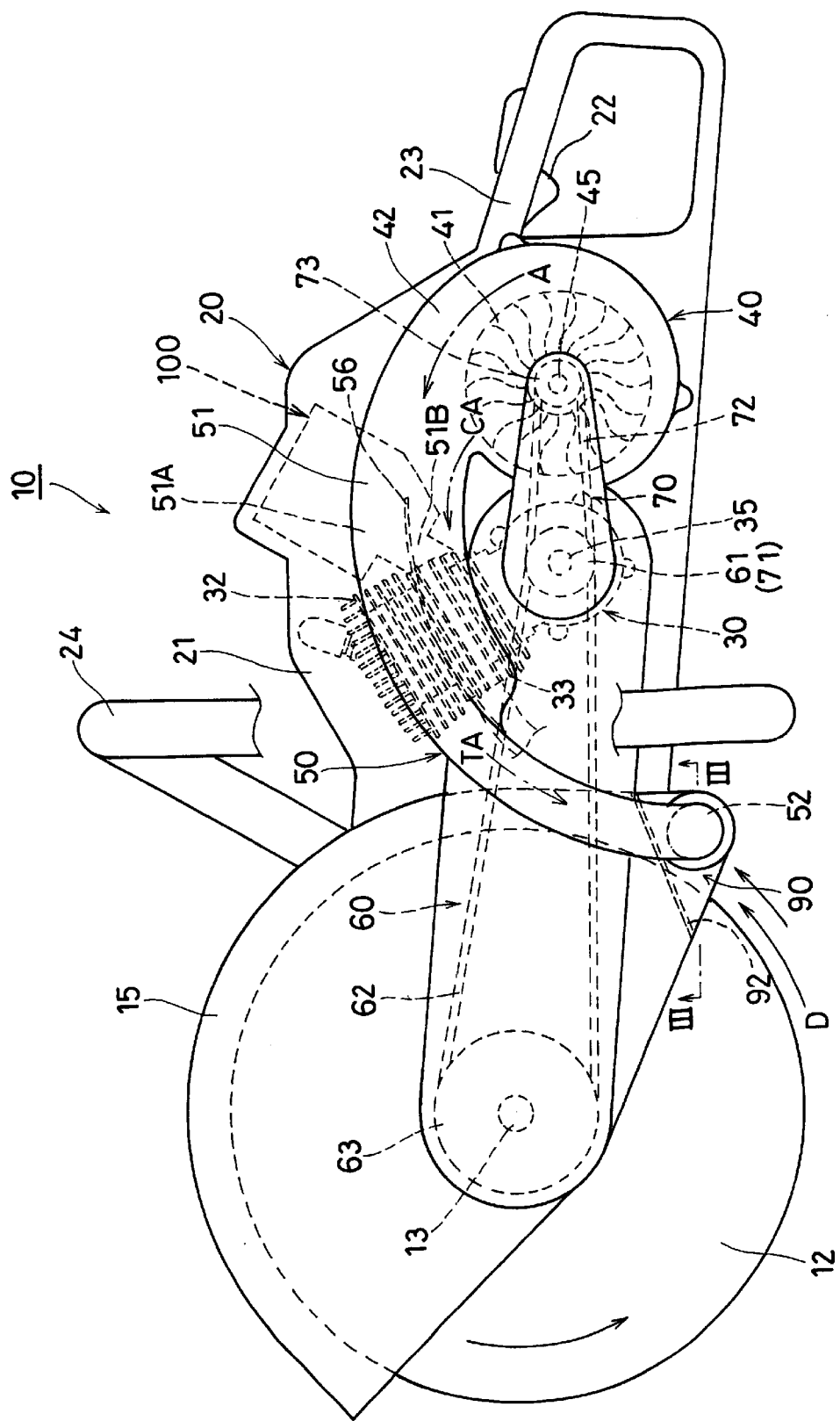
FIG. 1 is a left side view generally illustrating the engine cutter according to a first embodiment of the present invention.
Figure 2:
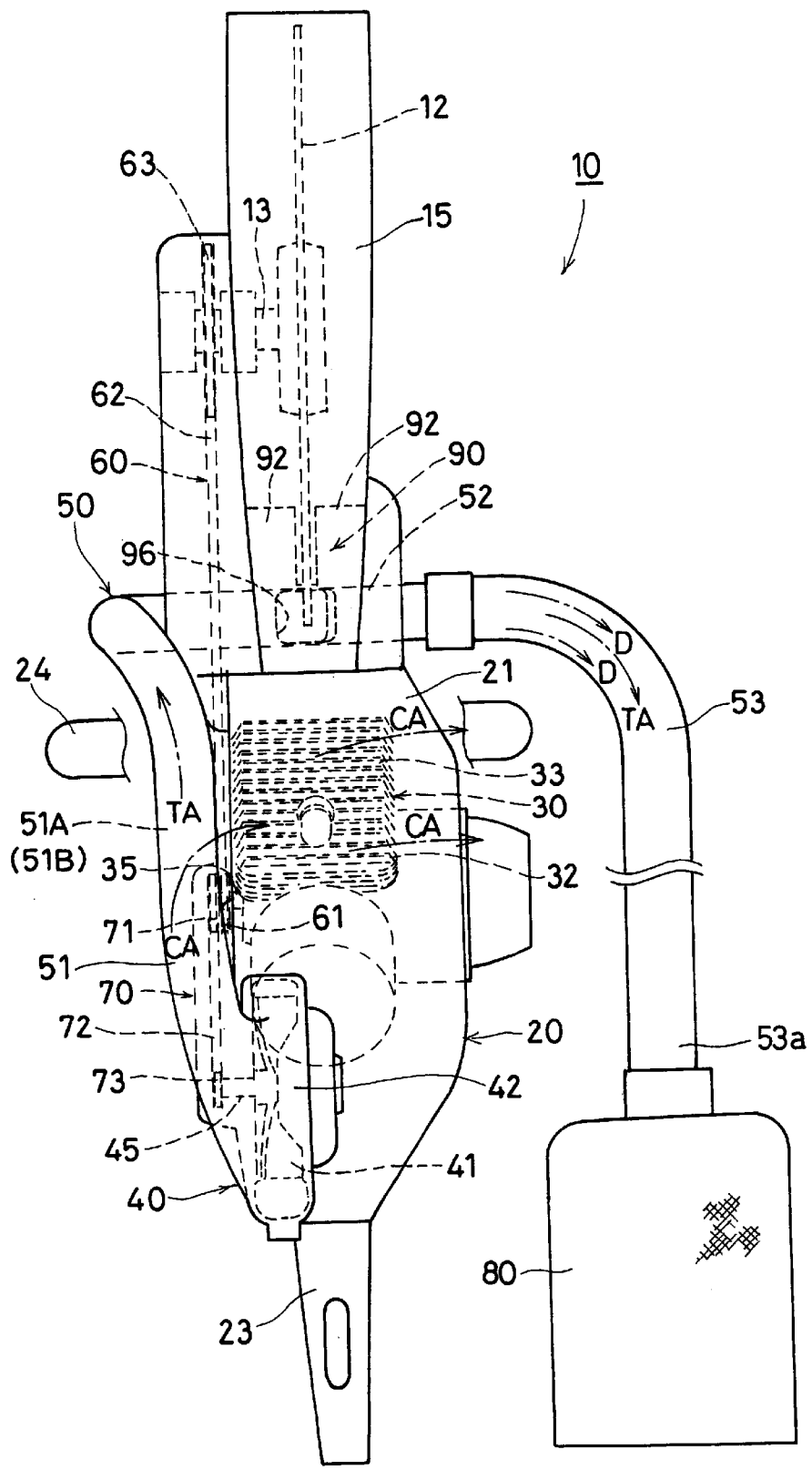
FIG. 2 is a plan view of the engine cutter shown in FIG. 1.

FIG. 1 is a left side view generally illustrating the engine cutter according to a first embodiment of the present invention, and FIG. 2 is a plan view of the engine cutter shown in FIG. 1.

The engine cutter 10 shown in FIGS. 1 and 2 comprises a disk cutter 12, a safety cover 15 encasing most of the upper and rear portion of the disk cutter 12, an air-cooled internal combustion engine 30 (hereinafter referred to as an internal combustion engine) for rotating the disk cutter 12, a main body 20 equipped with a centrifugal fan 40 to be employed not only for cooling the internal combustion engine 30 but also for sucking and discharging the dust produced by the engine cutter 10, both internal combustion engine 30 and main body 20 being disposed behind the safety cover 15.

The main body 20 is provided with a cover case 21, the rear end of which is disposed a rear handle 23 provided with a throttle trigger 22, etc. and extending in the longitudinal direction of the engine cutter 10. Further, a front handle 24 having a circular cross-section and shaped into a rectangular ring is attached to the main body 20 so as to surround the front peripheral portion of the main body 20.

The fan 40 is provided with fan blades 41 and a volute case 42 and positioned at a section of the main body 20 which is located on the rear left side of the internal combustion engine 30, with the rotation axis 45 of the fan blades 41 being directed orthogonal to the longitudinal direction of the main body 20, and an upstream portion 51 of an air flow passageway 50 integrally coupled with the volute case 42 being positioned over the fan 40.

The internal combustion engine 30 is provided with a fuel feeding device 100 consisting of an air cleaner, a carburetor, etc., and is disposed inside the cover case 21 in such a manner that it is erected almost vertically but slightly inclined forwardly, with a cylinder portion 32 thereof having a number of cooling fins 33 being positioned at the top.

The rotation of the output shaft (crank shaft) 35 of the internal combustion engine 30 is transmitted, while being decelerated, to the disk cutter 12 through a first belt driving mechanism 60 which is constituted by a first sprocket wheel 61 coaxially attached to the output shaft 35, a second sprocket wheel 63 having a larger diameter than that of the first sprocket wheel 61 and coaxially attached to the rotation axis 13 of the disk cutter 12, and a first belt 62 which is looped over the first and second sprocket wheels 61 and 63 so as to interconnect them.

The disk cutter 12 is designed to be rotated in the counterclock-wise direction in the state shown in FIG. 1, so that the dust D that will be generated during the cutting work of concrete-molded materials for instance by means of the disk cutter 12 is moved away along the rotational direction of the disk cutter 12 from the lower end portion (cutting portion) of the disk cutter 12 and finally splashed out rearward.

Additionally, the rotation of the output shaft 35 of the internal combustion engine 30 is transmitted, while being accelerated, to the fan blades 41 through a second belt driving mechanism 70 which is constituted by a third sprocket wheel 71 having the same diameter as that of the first sprocket wheel 61 and coaxially attached to the output shaft 35, a fourth sprocket wheel 73 having a smaller diameter than that of third sprocket wheel 71 and coax-ally attached to the rotation axis 45 of the fan 40, and a second belt 72 which is looped over the third and fourth sprocket wheels 71 and 73.

The upstream passage portion 51 of the air flow passageway 50 communicated with the fan 40 is branched at a midway between the upstream end portion and the central portion of the air flow passageway 50 by making use of a partitioning plate 56 into an upper passageway and a lower passageway, thus constituting a dust sucking and delivering passageway 51A and an engine cooling passageway 51B, respectively.

The dust sucking and delivering passageway 51A of the upstream passage portion 51 is arcuately extended in an obliquely downward direction so as to be communicated with a left end portion of an intermediate passageway 52 which is laterally extended at a lower rear end portion of the safety cover 15. The right end portion of an intermediate passageway 52 is communicated with a downstream passageway 53 which is composed of a flexible tube, etc., and the downstream end 53a of the downstream passageway 53 is provided with an air permeable dust collecting bag 80.

At the lower rear end portion of the safety cover 15 where the intermediate passageway 52 is disposed close thereto, there is disposed a dust-trapping portion 90 for trapping and discharging dust to be generated from a cutting work by the disk cutter 12.

Figure 3:
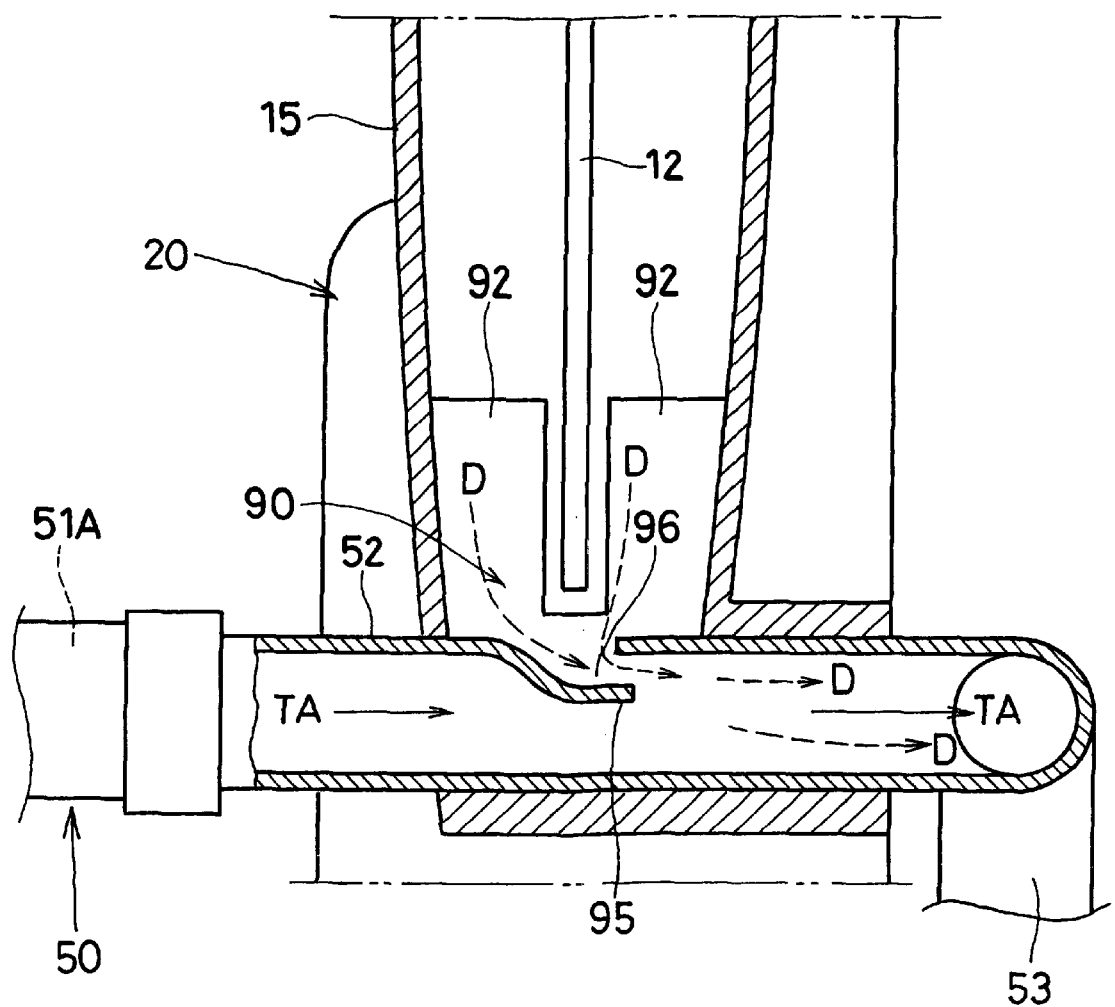
FIG. 3 is a cross-sectional enlarged view taken along the line III—III as indicated by the arrows in FIG. 1.

As clearly shown seen from FIGS. 1 and 2 together with FIG. 3, the dust-trapping portion 90 is mainly consisted of a pair of trap-guiding plates 92, a dust sucking port 96 formed at a portion of the intermediate passageway 52 (of the air flow passageway 50) which is located inside the safety cover 15, and a constricted guiding portion (Venturi tube portion) 95. The trap-guiding plates 92 are obliquely extended forward from a portion over the constricted guiding portion 95 down to the lower edge of the safety cover 15 in such a manner that part of the disk cutter 12 is placed between these trap-guiding plates 92 while leaving a small gap between both right and left sides of the disk cutter 12 and these trap-guiding plates 92, respectively. Further, the dust sucking port 96 is opened directed toward the downstream side of the air flow passageway 50 while allowing a rotating surface portion of the disk cutter 12 to pass through the center of the dust sucking port 96, thereby enabling the dust caught by the trap-guiding plates 92 to be effectively sucked.

According to the engine cutter 10 of this first embodiment that has been constructed as explained above, the disk cutter 12 and the fan 40 are driven to rotate by means of the internal combustion engine 30 on the occasion of cutting work, and the air flow A generated by the fan 40 is branched at an upstream passageway portion 51 of the air flow passageway 50 by making use of the partitioning plate 56 into the dust sucking and delivering passageway 51A and the engine cooling passageway 51B. In this embodiment, the volume of air flow A produced by the fan 40 is divided into the dust sucking and delivering passageway 51A and the engine cooling passageway 51B at a ratio of 7 to 3 for instance.

The air flow TA that has been diverted and introduced into the dust sucking and delivering passageway 51A is then allowed to flow into the intermediate passageway 52 in which the dust D caught by the trap-guiding plates 92 is sucked up through the dust sucking port 96 and then, transferred via the downstream passageway 53 to the dust collecting bag 80.

On the other hand, the air flow CA that has been diverted at the upstream passageway portion 51 of the air flow passageway 50 and introduced into the engine cooling passageway 51B is caused to change the direction of flow thereof by an angle of about 90 degrees and then, allowed to pass over the cylinder portion 32, thus mainly cooling the cylinder portion 32 of the internal combustion engine 30 before it is discharged outside from an air hole (not shown) formed on a right wall portion of the cover case 21.

Since a single piece of fan 40 is employed not only for cooling the internal combustion engine 30 but also for sucking and discharging the dust in the engine cutter 10 according to this embodiment, it is possible to simplify the construction of the cutter and to save the manufacturing cost thereof.

Further, since the rotation of the internal combustion engine is transmitted to the fan through an acceleration of the rotation of the internal combustion engine, the quantity of air demanded for cooling the engine as well as the quantity of air demanded for sucking and discharging dust can be sufficiently secured without so greatly increasing the diameter of the fan.

Figure 4:
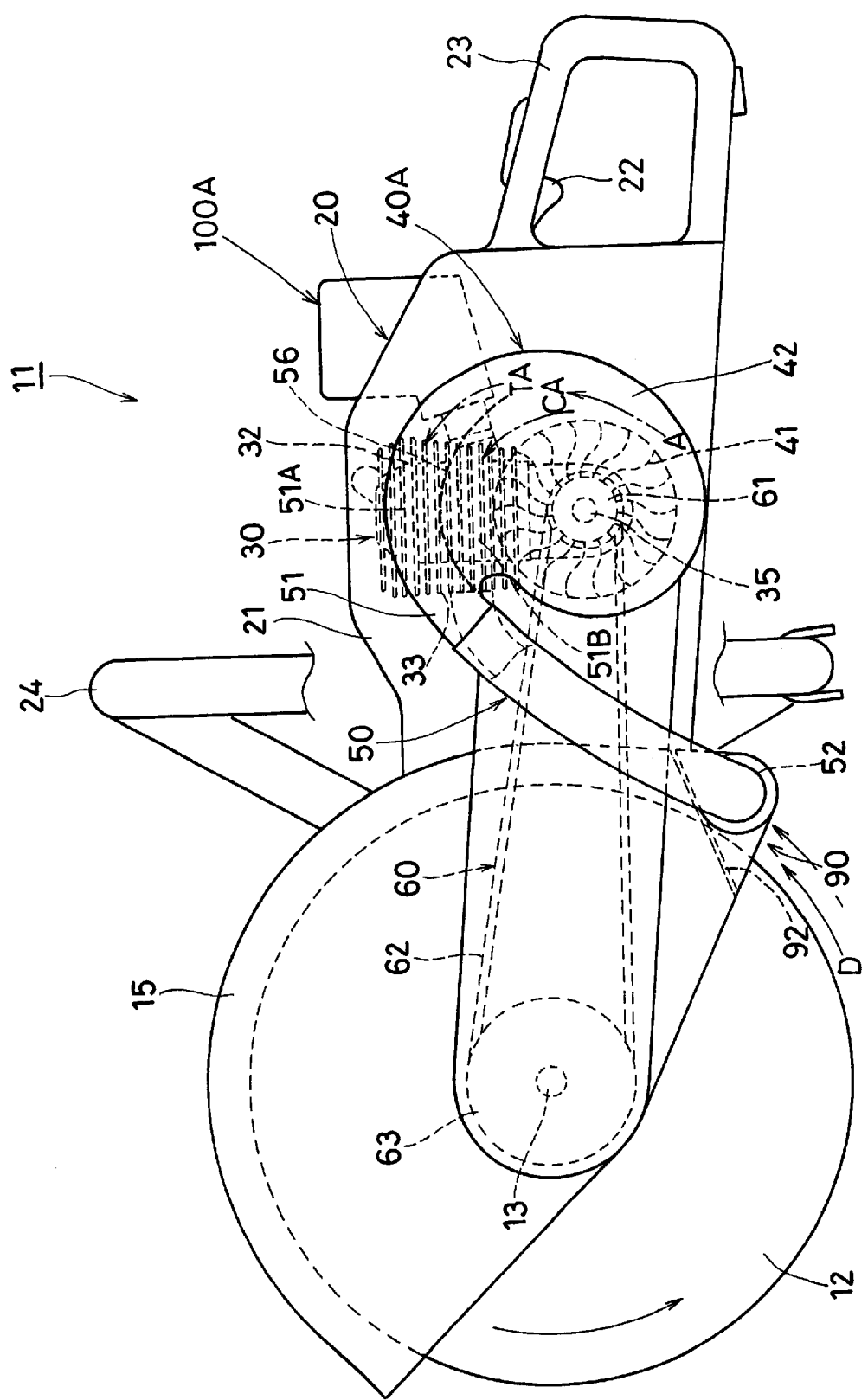
FIG. 4 is a left side view schematically illustrating the engine cutter according to a second embodiment of the present invention.
Figure 5:
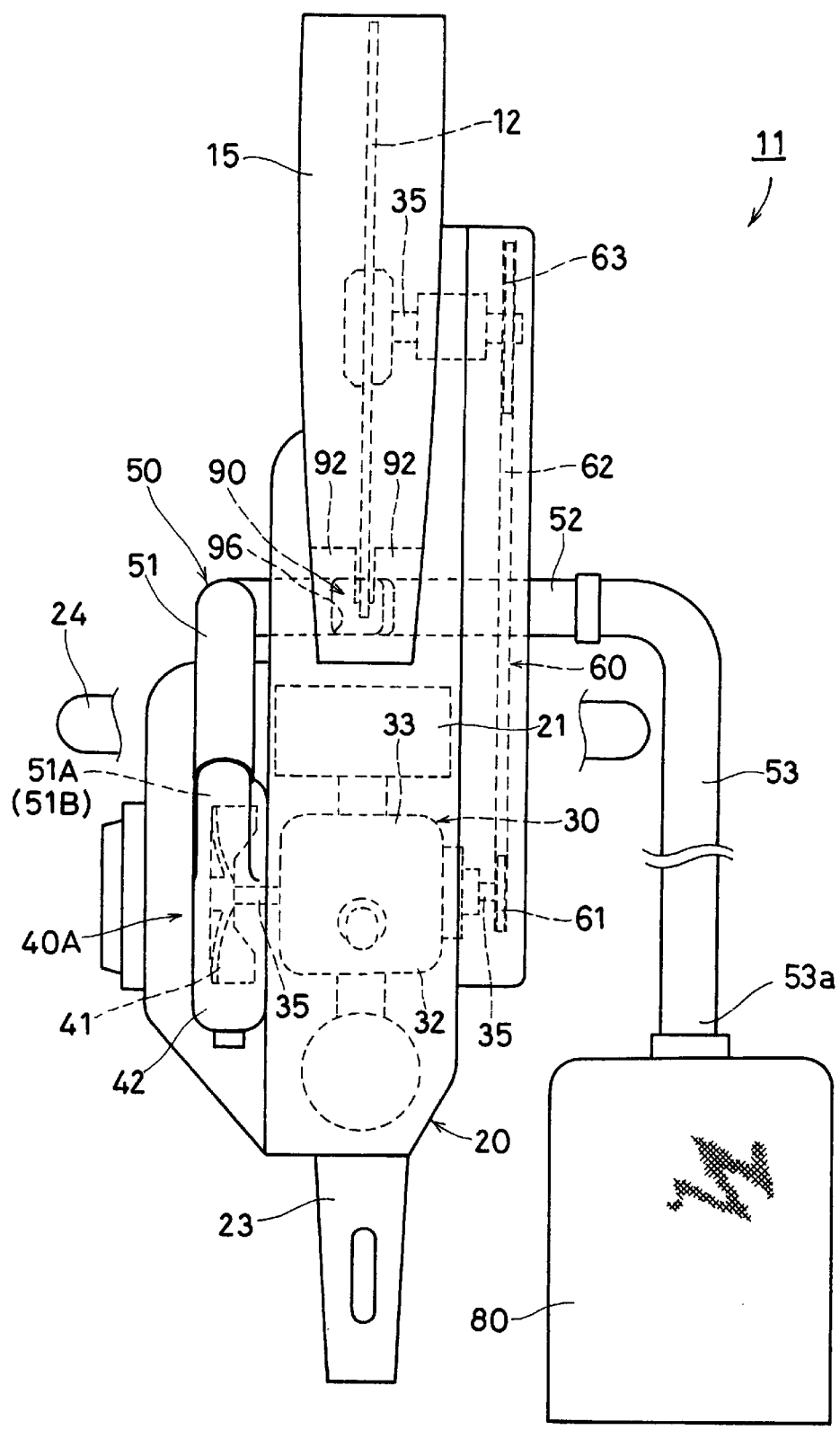
FIG. 5 is a plan view of the engine cutter shown in FIG. 4.

FIG. 4 is a left side view schematically illustrating the engine cutter 11 according to a second embodiment of the present invention, and FIG. 5 is a plan view of the engine cutter shown in FIG. 4. In this engine cutter 11 according to the second embodiment, the same components as those of the engine cutter 10 according to the aforementioned first embodiment are represented by the same reference numbers to thereby omit the explanation thereof. Therefore, only the differences between these embodiments will be mainly explained.

In this engine cutter 11 according to the second embodiment, the output shaft 35 of the internal combustion engine 30 is directly coupled with the fan 40A. More specifically, the fan blades 41 of the fan 40A is disposed on the left side of the output shaft 35 of the internal combustion engine 30, and the first belt driving mechanism 60 for transmitting the driving power to the disk cutter 12 is disposed on the right side of the output shaft 35.

In this engine cutter 11 according to the second embodiment also, the disk cutter 12 and the fan 40A are driven to rotate, on the occasion of cutting work, by means of the internal combustion engine 30 which is provided with a fuel feeding device 100 consisting of an air cleaner, a carburetor, etc. The air flow generated by the fan 40A is branched at an upstream passageway portion 51 of the air flow passageway 50 by making use of the partitioning plate 56 into the dust sucking and delivering passageway 51A and the engine cooling passageway 51B. The air flow TA that has been diverted and introduced into the dust sucking and delivering passageway 51A is then allowed to flow into the intermediate passageway 52 in which the dust D caught by the trap-guiding plates 92 is sucked up through the dust sucking port 96 and then, transferred via the downstream passageway 53 to the dust collecting bag 80.

On the other hand, the air flow CA that has been diverted at the upstream passageway portion 51 of the air flow passageway 50 and introduced into the engine cooling passageway 51B is also allowed to pass over the cylinder portion 32, thus mainly cooling the cylinder portion 32 of the internal combustion engine 30 before it is discharged outside from an air hole (not shown) formed on a right wall portion of the cover case 21.

Since a single piece of fan 40A is employed not only for cooling the internal combustion engine 30 but also for sucking and discharging the dust in the engine cutter 10 according to this embodiment also, it is possible to simplify the construction of the cutter and to save the manufacturing cost thereof.

In the foregoing explanation, the present invention has been explained with reference to preferable embodiments. However, the present invention should not be construed to be limited by these embodiments, but may be variously modified within the spirit of the present invention claimed in the appended claims.

For example, according to the aforementioned embodiments, the air flow A generated by the fan 40 (40A) is branched into the dust sucking and delivering passageway 51A and the engine cooling passageway 51B. However, the entire quantity of air flow A generated by the fan 40 may be allowed to flow toward the internal combustion engine 30 so as to utilize it for cooling the engine 30 before the air flow A is introduced in the dust sucking and delivering passageway 51A.

As seen from the aforementioned explanation, since a single piece of fan is employed not only for cooling the internal combustion engine but also for sucking and discharging the dust in the engine cutter of the present invention, it is possible to simplify the construction of the cutter and to save the manufacturing cost thereof.

Further, when the rotation of the internal combustion engine is transmitted to the fan through an acceleration of the rotation of the internal combustion engine, the quantity of air demanded for cooling the engine as well as the quantity of air demanded for sucking and discharging dust can be sufficiently secured without so greatly increasing the diameter of the fan.

All publications, patents and patent applications cited herein are incorporated herein by reference in their entirety.

What is claimed is:

1. An engine cutter comprising;
    a disk cutter having a cutting portion at the lower end portion thereof;
    an air-cooled internal combustion engine having an output shaft for rotating the disk cutter;
    a safety cover partially encasing the disk cutter;
    a dust-trapping portion mounted on the safety cover adjacent to and rearwardly of the cutting portion of the disk cutter for trapping and discharging dust to be generated from a cutting work by the disk cutter;
    an airflow passageway; and
    a fan having a rotation axis driven by the internal combustion engine for generating an air flow in the air flow passageway for sucking and discharging the dust therethrough that has been trapped in the dust-trapping portion and for generating a cooling air flow for cooling the internal combustion engine.

2. The engine cutter according to claim 1, wherein the airflow passageway is branched to generate
    (1) an first portion communicating with the dust-trapping portion for discharging dust trapped by the dust-trapping portion; and
    (2) a second portion communicating with the internal combustion engine for cooling the internal combustion engine.

3. The engine cutter according to claim 1, further comprising a belt-driving mechanism having a belt that couples the output shaft of the internal combustion engine and the rotation axis of the fan.

4. The engine cutter according to claim 3, wherein the belt transmits rotation of the internal combustion engine to the fan through an acceleration of the rotation of the internal combustion engine.

5. The engine cutter according to any one of claims 1, 2, 3 and 4, wherein said dust-trapping portion comprises
    a) trap-guiding plates interposed between the opposite surfaces of the cutter and the safety cover, and
    b) a dust sucking port located between the trap-guiding plates and the air flow passageway for discharging the dust,
    wherein the dust is collected by the trap-guiding plates, sucked through the dust sucking port and discharged through the airflow passageway.

6. The engine cutter according to any one of claims 1, 2, 3, 4, wherein a dust-collecting bag having air permeability is attached to a downstream end of a passageway for flowing the air flow generated by the fan.

* * * * *